United States Patent [19]

Taljan et al.

[11] Patent Number: 5,068,288
[45] Date of Patent: Nov. 26, 1991

[54] ACID ETCH RESISTANT CLEAR COATS

[75] Inventors: Dennis N. Taljan, North Ridgeville; R. Douglas Price, North Royalton, both of Ohio

[73] Assignee: PPG Industries, Inc., Pittsburgh, Pa.

[21] Appl. No.: 531,380

[22] Filed: May 31, 1990

[51] Int. Cl.$^5$ .............................................. C08L 63/00
[52] U.S. Cl. ................................. 525/155; 525/107; 525/110; 525/329.5; 525/518; 427/142; 427/214; 427/216; 427/421
[58] Field of Search ............ 525/155, 107, 110, 329.5, 525/518

[56] References Cited

U.S. PATENT DOCUMENTS

| | | | |
|---|---|---|---|
| 3,719,619 | 3/1973 | Nagata et al. | 260/22 CB |
| 3,758,635 | 9/1973 | Labana et al. | 525/208 |
| 4,163,739 | 8/1979 | Dalibor | 260/31.2 R |
| 4,181,784 | 1/1980 | Chattha et al. | 525/161 |
| 4,181,785 | 1/1980 | Chattha et al. | 525/161 |
| 4,184,025 | 1/1980 | Chattha | 525/161 |
| 4,363,896 | 12/1982 | Chattha | 525/161 |
| 4,818,796 | 4/1989 | Das et al. | 525/329.5 |

FOREIGN PATENT DOCUMENTS

1549059  7/1979  United Kingdom .

*Primary Examiner*—John C. Bleutge
*Assistant Examiner*—W. R. H. Clark
*Attorney, Agent, or Firm*—Gary J. Connell; William J. Uhl

[57] ABSTRACT

Curable compositions comprising blends of active hydrogen-containing polymers and curing agents therefor are disclosed. The blends comprise 5 to 60 percent by weight of a free radical initiated addition polymer prepared from a mixture of monomers comprising:
1) an epoxy monomer represented by the formula:

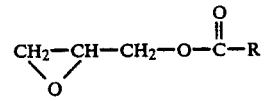

where R stands for tertiary aliphatic hydrocarbon group having 4 to 26 carbon atoms,
2) a polymerizable alpha, beta-ethylenically unsaturated carboxylic acid, and
3) optionally at least one other polymerizable alpha, beta-ethylenically unsaturated monomer.

Also present in the blend is 10 to 50 percent by weight of an acrylic copolymer different than the addition polymer mentioned above prepared from a mixture of monomers comprising:
1) a monomer of the formula:

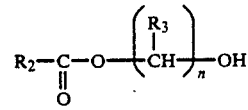

where $R_2$ is a polymerizable unsaturated hydrocarbon group, $R_3$ is hydrogen or $C_1$ to $C_4$ alkyl, n=2 to 4 and
2) at least one other unsaturated monomer copolymerizable therewith.

The composition also contains from 30 to 50 percent by weight of a curing agent reactive with the polymers mentioned above to form a crosslinked coating. The curable compositions are useful as clear coats and composite color/clear coatings where they provide resistance to acid etching.

12 Claims, No Drawings

ACID ETCH RESISTANT CLEAR COATS

BACKGROUND OF THE INVENTION

1. Field of the Invention

The present invention relates to curable compositions comprising blends of curable active hydrogen-containing polymers and curing agents therefor.

2. Brief Description of the Prior Art

Color-plus-clear coating systems involve the application of a colored or pigmented basecoat to a substrate followed by the application of a transparent or clear topcoat to the basecoat and are becoming increasingly popular as original finishes for automobiles. The color-plus-clear systems have outstanding gloss and distinctness of image and the clear coat is particularly important for these properties.

A serious problem associated with automotive finishes is acid etching which is the tendency of acidic materials to permanently spot and actually etch away the coating when placed in direct contact with the coating. Because many portions of the world, particularly industrial areas, have acidic environments, rain water becomes acidic and when left on the painted surface of an automobile, will cause this etching. If serious enough, the automobile may have to be repainted since it is very difficult to polish and buff out the spotting due to the acid etching. Therefore, it would be desirable to develop a curable composition which could be formulated into a clear coating composition which would have resistance to acid etching while maintaining the desired properties associated with clear coats for automobiles such as gloss, distinctness of image and exterior durability.

U.S. Pat. No. 4,818,796 discloses a clear coating composition which does have resistance to acid etching. The clear coating composition comprises as the resinous film-forming material a hydroxyl-containing polymer and a curing agent such as an aminoplast resin or a blocked isocyanate curing agent. The hydroxyl-containing polymer is prepared from a mixture of monomers comprising a monomer represented by the formula:

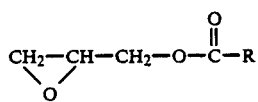

where R stands for tertiary aliphatic hydrocarbon group having 4 to 26 carbon atoms; a polymerizable alpha, beta-ethylenically unsaturated carboxylic acid and optionally at least one other polymerizable alpha, beta-ethylenically unsaturated monomer. Although the curable compositions when formulated into a clear coating composition have outstanding resistance to acid etching along with good gloss and distinctness of image, the compositions unfortunately have poor exterior durability, having a tendency to crack when exposed for long periods outdoors, particularly hot humid atmospheres associated with the state of Florida, U.S.A.

SUMMARY OF THE INVENTION

In accordance with the present invention, a curable composition comprising blends of active hydrogen-containing polymers and a curing agent therefor are provided. The compositions can be formulated into clear coating compositions and applied as clear coats in composite color-plus-clear coatings for automobiles. The compositions have good resistance to acid etching as well as outstanding gloss, distinctness of image and good long-term durability (as measured by accelerated testing). The blends of the active hydrogen-containing polymers and curing agent comprise:

A) 5 to 60 percent by weight of a free radical initiated addition polymer prepared from a mixture of monomers comprising:

1) an epoxy monomer represented by the formula:

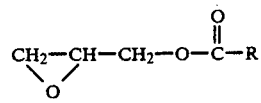

where R stands for tertiary aliphatic hydrocarbon group having 4 to 26 carbon atoms, 2) a polymerizable alpha, beta-ethylenically unsaturated carboxylic acid, and 3) optionally at least one other polymerizable alpha, beta-ethylenically unsaturated monomer;

B) from 10 to 50 percent by weight of an acrylic copolymer different than (A) prepared from a mixture of monomers comprising:

1) a monomer of the formula:

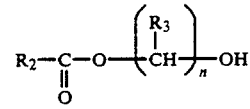

wherein $R_2$ is a polymerizable unsaturated hydrocarbon group and $R_3$ is hydrogen or $C_1$ to $C_4$ alkyl, $n=2$ to 4 and 2) at least one other unsaturated monomer copolymerizable therewith;

C) from 30 to 50 percent by weight of a curing agent reactive with (A) and (B). The percentage by weight is based on total weight of (A), (B) and (C).

DETAILED DESCRIPTION

The reactive ingredients used in preparing the addition polymer are a free radical initiated polymerizable alpha, beta-ethylenically unsaturated carboxylic acid and an epoxy monomer of the formula:

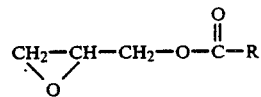

where R is as defined above.

Examples of polymerizable alpha, beta-ethylenically unsaturated acids are monocarboxylic acids such as acrylic acid, methacrylic acid, crotonic acid; dicarboxylic acids such as itaconic acid, maleic acid and fumaric acid; monoesters of dicarboxylic acids such as monobutyl maleate and monobutyl itaconate. Preferred are monocarboxylic acids, especially acrylic acid and methacrylic acid.

The epoxy monomers are those which are not polymerizable with the alpha, beta-ethylenically unsaturated acid. In other words, the epoxy compound does not contain alpha, beta-ethylenic unsaturation which would participate in free radical initiated polymerization with the alpha, beta-ethylenically unsaturated acid. Examples of such epoxy monomers are glycidyl esters containing from 8 to 30 carbon atoms such as glycidyl stearate.

Preferably, R is a branched hydrocarbon radical, more preferably a tertiary aliphatic group of 8 to 10 carbon atoms such as neopentanoate, neoheptanoate and neodecanoate. Glycidyl esters of commercially available mixtures of tertiary aliphatic carboxylic acids such as those available from the Shell Chemical Company as VERSATIC ACID 911 are particularly preferred. The glycidyl esters themselves are also commercially available from Shell Chemical Company as CARDURA E.

The polymerizable alpha, beta-ethylenically unsaturated carboxylic acid and epoxy monomer are present in an equivalent ratio (acid to epoxy) of at least 1:1, usually 10 to 1:1. The polymerizable alpha, beta-ethylenically unsaturated carboxylic acid and epoxy monomer constitute at least 80 percent, more preferably at least 85 percent by weight of the total weight of the monomers used in preparing the addition polymer with the remaining portion of the monomers being selected from other polymerizable alpha, beta-ethylenically unsaturated monomers such as esters of alpha, beta-ethylenically unsaturated acids, for example, alkyl esters of acrylic and methacrylic acid containing from 1 to 12 carbon atoms in the alkyl group and hydroxyalkyl esters of acrylic and methacrylic acid containing from 2 to 3 carbon atoms in the alkyl group. Specific examples of such ester would be methyl methacrylate, butyl acrylate, hydroxyethyl methacrylate and hydroxypropyl acrylate. Other polymerizable alpha, beta-ethylenically unsaturated monomers such as styrene and vinyl toluene, vinyl chloride, vinyl acetate and acrylonitrile may also be used as can mixtures of monomers. The other monomers if used are preferably of 20 percent or less, more preferably 15 percent or less of the total weight of the monomers used in preparing the addition polymer.

The addition polymers of the present invention are prepared by free radical initiated organic solution polymerization techniques. In one embodiment, the alpha, beta-ethylenically unsaturated acid and epoxy compound are pre-esterified prior to free radical initiated polymerization. Alternatively, the alpha, beta-ethylenically unsaturated acid and epoxy compound can be simultaneously esterified and polymerized. This latter method of reaction is preferred because it only involves one step instead of two. Also, when the reactive ingredients are pre-esterified, they are usually done so in the presence of catalyst such as amine and free radical inhibitor which are detrimental to coating performance, especially color.

In conducting the polymerization and esterification simultaneously, the temperature should be high enough to insure that the polymerization and esterification are occurring at about the same rate. In conducting the reaction, the reactive ingredients are heated in the presence of a free radical initiator and optionally a chain transfer agent in an organic solvent in which the ingredients as well as the resultant polymer are soluble. Typically, the epoxy compound along with a portion of the alpha, beta-ethylenically unsaturated acid and optionally the chain transfer agent is charged to a reaction vessel and heated under an inert atmosphere to reflux. The alpha, beta-ethylenically unsaturated acid and optionally the other alpha, beta-ethylenically unsaturated monomers and the free radical initiator are added slowly to the refluxing reaction mixture. After the addition is complete, some additional free radical initiator may be added and the reaction mixture held at elevated temperature to complete the reaction. The temperature of reaction is preferably at least 130° C., more preferably from 150° to 180° C. to insure that the free radical initiated polymerization is occurring at the same rate as the esterification reaction between the epoxy and acid groups without any added catalyst such as tertiary amine. Lower temperatures may be used if the glycidyl compound and the alpha, beta-ethylenically unsaturated acid are pre-esterified prior to the free radical initiated polymerization.

Among the organic solvents which may be used for the polymerization are those which have a boiling point of at least 150° C. and usually from 150° to 210° C. These would include, for example, ketones such as methyl amyl ketone; esters such as hexyl acetate and heptyl acetate,; glycol ethers and glycol esters such as propylene glycol monoethyl ether acetate and isobutyl isobutyrate.

Usually, the amount of organic solvent which is used is from about 50 to 80 percent by weight based on total weight of organic solvent and reactive ingredients.

Examples of free radical initiators are those which are soluble in the polymerization medium such as azobis-(isobutyronitrile), azobis-(alpha, gamma-dimethylvaleronitrile), tertiary-butylperbenzoate, tertiary-butylperacetate, ditertiarybutyl peroxide and benzoyl peroxide. The free radical initiator is usually present in amounts of about 0.1 to 10 percent by weight based on total weight of polymerizable alpha, beta-ethylenically unsaturated monomer.

Examples of the chain transfer agents are alkyl mercaptans such as tertiary-dodecyl mercaptan. When used, these materials are present in an amount of up to 5 percent by weight based on weight of polymerizable alpha, beta-ethylenically unsaturated monomers.

The addition polymers of the present invention have hydroxyl numbers of at least 130, preferably 135 to 168 (100 percent solids) and preferably weight average molecular weights (Mw) of less than 15,000, more preferably about 1000 to 6000. Mw greater than 15,000 are less preferred because the resultant polymers will have high viscosities and require high amounts of organic solvent to formulate coating compositions with the proper application properties. The molecular weights of the polymers are determined by gel permeation chromatography using a polystyrene standard. Therefore, what is obtained is a polystyrene number. However, for the purposes of the invention, they are considered to be molecular weights.

Besides the addition polymer, the curable composition also contains an acrylic copolymer which is different than the addition polymer. The acrylic copolymer is prepared from a mixture of monomers comprising a monomer of the formula:

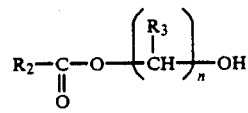

where $R_2$, $R_3$ and n are as defined above, and at least one other unsaturated monomer copolymerizable therewith. Examples of the hydroxyl group-containing monomers mentioned above are hydroxyalkyl esters of acrylic or methacrylic acid containing from 2 to 4 carbon atoms in the alkyl group such as hydroxyethyl acrylate, hydroxyethyl methacrylate, hydroxypropyl acrylate and hydroxypropyl methacrylate. Also, hydroxyl group-containing monomers such as the reaction products of hydroxyethyl acrylate and epsilon-caprolactone can be used.

The amount of the hydroxyl group-containing monomer which is used is from about 10 to 60, preferably 25 to 50 percent by weight based on total weight of alpha, beta-ethylenically unsaturated monomers.

Examples of the other unsaturated monomers copolymerizable with the hydroxyl group-containing monomer are those which do not contain hydroxyl groups and specific examples include vinyl aromatic compounds such as styrene and vinyl toluene; alkyl esters of acrylic and methacrylic acid containing from 1 to 12 carbon atoms in the alkyl group such as ethyl methacrylate, ethyl acrylate, butyl acrylate and 2-ethylhexyl acrylate; acrylate monomers containing amido groups such as acrylamide and methacrylamide. Examples of other polymerizable alpha, beta-ethylenically unsaturated monomers are vinyl halides such as vinyl chloride and vinyl fluoride; vinyl nitriles such as acrylonitrile, methancrylonitrile; vinyl esters such as vinyl acetate and vinyl propionate.

Preferably, also present in the composition is an alpha, beta-ethylenically unsaturated monomer which is a 2,4-diaryl-1-alkene. Examples of such materials are those of the structure:

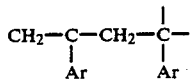

where Ar is an aryl group such as phenyl. Examples of such monomers are 2,4-diphenyl-4-methyl-1-pentene. Also, materials such as the dimer of alpha-methyl-styrene can be used. Such a material is a mixture of 2,4-diphenyl-4-methyl-pentene-1; 2,4-diphenyl-4-methyl-pentene-2 (cis and trans) and 1,1,3-trimethyl-3-phenyl-endane. The amount of such an unsaturated monomer will vary between 1 to 20, preferably 5 to 15 percent by weight based on total weight of the polymerizable alpha, beta-ethylenically unsaturated monomers.

The amount of the alpha, beta-ethylenically unsaturated monomer free from hydroxyl groups is from 40 to 90, preferably 50 to 75 percent by weight based on total weight of polymerizable alpha, beta-ethylenically unsaturated monomers.

The acrylic polymers used in the present invention are prepared in organic solvent by free radical initiated solution polymerization techniques in which the reactive ingredients are heated in the presence of a free radical initiator in the organic solvent in which the ingredients as well as the resultant polymer are soluble. The preferred free radical initiator is t-amylperoxy compounds such as 1,1-di(t-amylperoxy) cyclohexane. Also, t-amylperoxy esters such as t-amylperoxy acetate and ethyl-3,3-di(t-amylperoxy) butyrate can be used. Other free radical initiators such as those mentioned above in connection with the free radical initiated addition polymer can be used but their use is not preferred. The amount of free radical initiator which is used will vary in amounts from about 1 to 10, preferably 2 to 8 percent by weight based on weight of the polymerizable alpha, beta-ethylenically unsaturated monomers.

Typically, the monomers and the free radical initiator are added slowly to the refluxing organic solvent. After addition is complete, additional free radical initiator may be added to complete the reaction.

Preferably, the organic solvent is a high boiling solvent, preferably one having a boiling point at atmospheric pressure of at least 150° C., preferably 160° to 185° C., and the reaction is preferably conducted under refluxing conditions. Examples of suitable solvents are high boiling esters such as hexyl acetate and heptyl acetate. Examples of other solvents which can be used include ketones such as methyl amyl ketones; glycol ethers such as 2-butoxyethanol, propylene glycol monoethyl ether; alcohols such as benzyl alcohol; esters such as 2-butoxyethyl acetate, 1-ethyl-3-ethoxy-3-propionate and aromatics such as xylene and mixtures of aromatic compounds such as those available under the trademark SOLVESSO 100. The amount of organic solvent which is used will range from 10 to 50. preferably 20 to 40 percent by weight based on total weight of monomers and organic solvent.

Preferably, the acrylic copolymer will have a weight average molecular weight (Mw) less than 6000, preferably 2000 to 5000, and the molecular weight distribution Mw/Mn of less than 2.5, usually about 1.9 to 2.5. The molecular weight is determined as described above, i.e., by gel permeation chromatography using a polystyrene standard. Thus, the numbers obtained are really polystyrene numbers; however, for the purposes of the invention, they are considered to be molecular weights.

To form curable or thermosetting compositions, the active hydrogen-containing polymers of the present invention are combined with a curing agent which is reactive with the active hydrogens in the polymers. The preferred curing agents are aminoplast resins which are aldehyde condensation products of amines or amides with aldehydes. Examples of suitable amines or amides are melamine, benzoguanamine, urea and similar compounds. Generally, the aldehyde employed is formaldehyde, although products can be made from other aldehydes such as acetaldehyde and furfuryl. Condensation products contain methylol groups or similar alkylol groups depending upon the particular aldehyde employed. If desired, these methylol groups can be etherified by reaction with an alcohol. Various alcohols are employed and generally include any monohydric alcohol, although the preferred alcohol contains from 1 to 4 carbon atoms such as methanol, ethanol, isopropanol and n-butanol. Aminoplasts are commercially available from the American Cyanamide Company under the trademark CYMEL and from the Monsanto Chemical Company under the trademark RESIMINE.

Besides aminoplasts, other curing agents such as polyisocyanates which are reactive with hydroxyl groups can be used.

Among the polyisocyanates which may be used are aliphatic or alicyclic polyisocyanates such as hexamethylene diisocyanate, dicyclo-hexylmethane diisocyanate, aromatic polyisocyanates such as 2,4- and 2,6-toluene diisocyanate, diphenylmethane-4,4'-diisocyanate; arylalkyl polyisocyanates such as o-, m- and p-xylylene diisocyanate; isophorone diisocyanate; polyurethane polyisocyanates obtained from reacting polyisocyanate such as those mentioned above with polyhydroxy compounds such as ethylene glycol and trimethylolpropane. Polyisocyanates containing isocyanurate, allophanate or biuret groups can also be used. The polyisocyanate is used in amounts so that there are 0.3 to 5.0 equivalents of isocyanate for each equivalent of hydroxyl.

The curable compositions typically comprise from 5 to 60, preferably 20 to 50 percent by weight of the free radical initiated addition polymer. Amounts less than 5 percent by weight do not provide for optimum acid etch resistance whereas amounts greater than 60 percent by weight do not provide for optimum exterior durability.

The acrylic copolymer typically comprises from 10 to 50, preferably 15 to 40 percent by weight of the curable composition. Amounts less than 10 percent by weight are not preferred because of loss of solvent resistance, whereas amounts greater than 50 percent by weight are not preferred because of greater amounts of organic solvent needed to get proper spray viscosity.

The curing agent is typically present in amounts of 20 to 60, preferably 30 to 50 percent by weight.

The percentages by weight are based on total weight of the free radical initiated addition polymer, acrylic polymer and curing agent.

To promote curing of the compositions of the invention, the compositions will optionally contain a curing catalyst to facilitate curing of the active hydrogens with the curing agent. Examples of catalyst for the aminoplast curing agents are acidic materials such as acid phosphates, which are preferred such as aryl acid phosphates, particularly phenyl acid phosphate, sulfonic acids such as para-toluene sulfonic acid and dodecyl benzene sulfuric acid. The amount of catalyst present in the compositions is typically from 0.2 to 5 percent by weight based on weight of resin solids.

With the preferred acid phosphate, relatively high levels of catalyst, i.e., 3 to 5 percent by weight are particularly desirable because they provide for optimum resistance to acid etching. However, such high levels of catalyst may adversely affect humidity resistance of the resultant coating. This can be compensated for, however, by proper selection of the aminoplast curing agent. Methylated melamine formaldehyde resins are particularly preferred in this regard.

Examples of catalyst for isocyanate curing agents are tin compounds such as dialkyl tin compounds such as dibutyltin dilaurate and dibutyltin oxide. The amount of these catalysts present in the composition is typically from 0.01 to 2 percent by weight based on weight of resin solids.

In addition to catalyst, other optional ingredients such as adjuvant hydroxy-containing polymers, fillers, plasticizers, catalysts, reactive diluents, anti-oxidants, ultraviolet light absorbers, flow control agents and other formulating additives can be employed if desired. These materials will generally constitute up to 30 percent by weight of the composition based on total weight of the resin solids.

Although particularly useful in clear coat applications, the compositions of the present invention can also be pigmented to form color coats which may be used as base coats in color/clear applications. The pigment may be any of the conventional types comprising, for example, iron oxide, lead oxides, strontium chromate, carbon black, coal dust, titanium dioxide, talc, barium sulfate, as well as the color pigments such as cadmium yellow, cadmium red, chromium yellow, phthalocyanine blue, toluidine red, and the metallic pigments such as aluminum flake and metal oxide encapsulated mica. When used, the pigment content of the coating composition is expressed as a pigment to resin weight ratio, and is usually within the range of about 0.05 to 0.25:1.

The compositions of the present invention can be formulated into high resin solids coating compositions, that is, coating compositions having a resin solids content of at least 50 and usually from about 50 to 75 percent by weight with the solids being determined by heating at 110° C. for 60 minutes.

The ingredients are typically mixed together with low shear mixing and then with solvent if necessary to get the proper viscosity for coating applications, that is, a No. 4 Ford cup viscosity of 15 to 28 seconds.

Coatings formulated with the compositions of the present invention can be applied to substrates such as automobiles and the like using conventional methods of application such as spray coating including electrostatic spray coating. Preferably, the coatings are applied as high solids clear coatings over colored or pigmented base coats via a wet on wet technique where the base coat is not cured prior to application of the top coat. Typically, the base coat is given a flash for 1 to 10 minutes at ambient conditions prior to application of the clear coat. The two coatings are then typically cured by heating to a temperature of from about 75° to 150° C., preferably 80° to 125° C., for about 10 to 60 minutes. The curing temperature and time will depend somewhat on the curing agent used. The film thickness of the clear coat is typically 1 to 3 mils and the base coat from 0.5 to 2 mils.

The compositions of the invention can be further illustrated by reference to the following examples where parts are parts by weight unless otherwise indicated.

EXAMPLES

The following examples (A–B) are of a free radical initiated addition polymer and an acrylic copolymer used in the practice of the invention.

EXAMPLE A

A free radical initiated addition polymer from the glycidyl ester of versatic acid (CARDURA E), acrylic acid (1:1 equivalent ratio of acid to epoxy), methyl methacrylate and butyl acrylate was prepared as follows:

| Ingredients | Parts by Weight (in grams) |
|---|---|
| CARDURA E[1] | 937.5 (75.3%) |
| DOWANOL PM acetate[2] | 107.5 |
| Methyl methacrylate | 25.1 (2%) |
| Acrylic acid | 270.0 (21.7%) |
| DOWANOL PM acetate | 378.0 |
| Ditertiarybutyl peroxide | 3.75 |
| Butyl acrylate | 12.4 (1%) |

[1]Glycidyl ester of versatic acid available from Shell Chemical Company.
[2]Propylene glycol monoethyl ether acetate available from Dow Chemical Company.

The CARDURA E and first portion of DOWANOL PM acetate were charged to a suitable reactor and heated under a nitrogen atmosphere to reflux at about 160° C. The methyl methacrylate, acrylic acid, second portion of DOWANOL PM acetate, ditertiarybutyl peroxide and butyl acrylate were premixed and added to the reactor charge solely over a period of about 3 hours while maintaining the reaction temperature at reflux. When addition was complete, the reaction mixture was held for 4 hours at 155° C. until an acid value of 1.32 was obtained. The reaction mixture was cooled to room temperature and found to have a solids content of 70 percent. The polymer had a hydroxyl number of 168 (100 percent solids) and a weight average molecular weight (Mw) of about 5300.

EXAMPLE B

A 68.5 percent solids acrylic copolymer was prepared from 40 percent hydroxypropyl acrylate, 10 percent styrene, 10 percent alpha-methylstyrene, 19 percent butyl acrylate, 18.5 percent butyl methacrylate, 2 percent acrylic acid and 0.5 percent methyl methacrylate. The copolymer had an Mn of about 2170 and an Mw of about 4757. The solvent comprised a 1:1 blend of xylene and SOLVESSO 100.

The copolymer was prepared by free radical initiated solution polymerization techniques as described in U.S. Pat. No. 4,808,656.

The following examples (1-3) show the preparation of various curable compositions comprising blends of addition polymer (Example A) with the acrylic copolymer (Example B) and various aminoplast curing agents. The curable compositions were formulated into clear coating compositions, applied via a wet-on-wet coating technique to previously painted substrates and cured to form color-clear composite coatings. For the purpose of comparison, clear coating compositions prepared with only the free radical initiated addition polymer of Example A and curing agent (Comparative Example 4) and the acrylic polymer of Example B and aminoplast curing agents (Comparative Example 5) were also prepared and applied to previously coated substrates as described in connection with Examples 1-3. The coatings were evaluated for hardness, gloss, distinctness of image, humidity resistance, durability resistance as measured by accelerated QUV testing and resistance to acid etching.

EXAMPLE 1

A clear coating composition was formulated from the following resinous ingredients:

| Ingredients | Parts by Weight (in grams) | Solids (in grams) | Percentage by Weight[1] |
|---|---|---|---|
| Addition polymer of Example A | 206 | 144.2 | 33.75 |
| Acrylic copolymer of Example B | 133 | 91.1 | 21.32 |
| CYMEL 1161[2] | 192.0 | 192.0 | 44.93 |

[1]Percentage by weight based on total solids weight of addition polymer, acrylic polymer and aminoplast curing agent.
[2]Mixed isobutylated, methylated melamine-formaldehyde resin available from American Cyanamid Company.

The resinous ingredients described above were further formulated with 20 percent by weight based on weight of resin solids of a polyester polyol formed from condensing trimethylpentanediol and hexahydrophthalic anhydride (65:35 weight ratio) in N-butylacetate until an acid value of 8 to 10 was obtained. The resultant polyester had a hydroxyl value of 200-220 and a solids content of 90 percent. Also present in the formulation was 0.3 percent by weight of phenyl acid phosphate and 0.8 percent by weight dodecyl benzene sulfonic acid catalyst; the percentages by weight of these ingredients being on resin solids of the composition. Also present in the formulation were organic solvents, UV light stabilizers, rheology modifiers and flow control agents as is well known in the art.

The composition had a solids content of 59.43 percent and a No. 4 Ford cup viscosity of 24 seconds.

The composition was spray applied (wet on wet) to a steel panel which had been previously coated with a deep blue metallic automotive basecoat composition available from PPG Industries, Inc. as HUBC 15898. The basecoat was spray applied to a thickness of 0.8 mil and given a 3-minute air flash before application of the clear coat which was applied in two passes with a 10 minute air flash between passes. The thickness of the clear coat was 1.8 mils. The composite coating was baked at 250° F. (121° C.) for 30 minutes to cure the coating. The properties of the coating are reported in the table below.

EXAMPLE 2

A clear coating composition similar to Example 1 was prepared with the exception that the phenyl acetate phosphate catalyst was raised to 5.0 percent by weight and the dodecyl benzene sulfonic acid catalyst was not used. The composition had a solids content of 58.16 percent and a No. 4 Ford cup viscosity of 23.5 seconds. The composition was spray applied to a steel panel as described in Example 1 and the resultant composite coating cured as also described in Example 1. The properties of the coating are reported in the table below.

EXAMPLE 3

A clear coating composition similar to Example 2 was prepared with the exception that the CYMEL 1161 was replaced with 213 grams (90 percent resin solids) of RESIMINE 741 which is a methylated melamine-formaldehyde resin available from Monsanto Company. The composition had a solids content of 54.95 percent and a No. 4 Ford cup viscosity of 24 seconds. The composition was spray applied to a steel panel as described in Example 1 and the resultant coating composition cured as also described in Example 1. The properties of the coating are reported in the table below.

COMPARATIVE EXAMPLE 4

For the purposes of comparison, a clear coating composition similar to Example 1 was prepared with the exception that no addition polymer was used. The composition contained the following resinous ingredients:

| Ingredients | Parts by Weight (in grams) | Solids (in grams) | Percentage by Weight |
|---|---|---|---|
| Acrylic copolymer of Example B | 343 | 234.96 | 55.03 |
| CYMEL 1161 | 192.0 | 192.0 | 44.97 |

The resinous ingredients were formulated with the polyester, catalyst, solvent and additives as described in Example 1. The composition had a solids content of 58.11 percent and a No. 4 Ford cup viscosity of 24.3 seconds. The composition was spray applied to a steel panel as described in Example 1 and the resultant composite coating cured as also described in Example 1. The properties of the coating are reported in the table below.

COMPARATIVE EXAMPLE 5

For the purposes of comparison, a clear coating composition similar to Example 1 was prepared with the exception that no acrylic copolymer was used. The composition contained the following resinous ingredients:

| Ingredients | Parts by Weight (in grams) | Solids (in grams) | Percentage by Weight |
|---|---|---|---|
| Addition polymer of Example A | 405 | 283.5 | 59.62 |
| CYMEL 1161 | 192 | 192 | 40.38 |

The resinous ingredients were formulated with a polyester, catalyst, solvent and additives as generally described in Example 1. The composition had a solids content of 58.27 percent and a No. 4 Ford cup viscosity of 23.8 seconds.

The composition was spray applied to a steel panel as described in Example 1 and the resultant coating cured as also described in Example 1. The properties of the coating are reported in the table below.

TABLE

| | Cured Coating Properties of Examples 1-5 | | | | | | |
|---|---|---|---|---|---|---|---|
| | Tukon | | | Acid Etching[4] | | | Humidity | Long Term |
| Example | Hardness[1] | Gloss[2] | DOI[3] | HCl | $H_2SO_4$ | $H_3PO_4$ | Resistance[5] | Exposure[6] |
| 1 | 9.60 | 89 | 93.5 | 2 | 6 | 4 | 0 | no cracking |
| 2 | 12.0 | 90 | 88.5 | 2 | 10 | 4 | 8 | no cracking |
| 3 | 14.3 | 90 | 75.9 | 2 | 10 | 4 | 4 | no cracking |
| 4 | 11.4 | 89 | 92.7 | 6 | 10 | 6 | 0 | no cracking |
| 5 | 7.16 | 89 | 93.7 | 2 | 2 | 4 | 0 | cracking |

[1] Determined by ASTM E-84.
[2] Measured with a 20° gloss meter manufactured by Gardner Instrument Company.
[3] Measured on a Dori-Gon meter D47-6 manufactured by Hunter Laboratories.
[4] 3 cc. of .6 N HCl, .6 N $H_2SO_4$ and .6 N $H_3PO_4$ placed on cured coating and exposed to 25 percent relative humidity at 120° F. (49° C.) for 30 minutes. Ratings are given a value of 0 to 10. A rating of 0 indicates no change in the coating. A rating of 10 indicates complete coating removal.
[5] Humidity resistance determined by placing coated panels in a humidity chamber maintained at 100° F. (38° C.) and 100 percent relative humidity for 10 days. The panels were removed and evaluated for retention of DOI. A rating of 0 indicates greater than 90 percent retention of DOI; a rating of 4 indicates greater than 70 percent retention of DOI and a rating of 8 indicates greater than 40 percent retention of DOI.
[6] Long-term exposure measured by accelerated QUV testing. QUV exposure is determined by exposing the coated panels to alternating cycles of UV light (16 hours light; 8 hours dark) and condensing humidity in a Q-U-V Accelerated Weathering Tester manufactured by the Q-Panel Co. The UV light is generated with a UV B313 lamp (320-280 nanometers). The temperature of the UV light cycle is 70° C. The temperature of the condensing humidity is 50° C. After 2000 light hours, the testing was stopped and the panels evaluated.

The results in the table above show that overall improved resistance to acid etching is achieved using the blend of the addition polymer of Example A and the acrylic polymer of Example B over the comparative example which used only the acrylic polymer (Comparative Example 4). Although Comparative Example 5 gave the best overall acid resistance, it cracked upon accelerated long-term exposure. The compositions of the present invention showed no tendency to crack upon these exposure conditions.

We claim:

1. A curable composition comprising blends of active hydrogen-containing polymers and a curing agent therefor comprising:
   (A) 5 to 60 percent by weight of a free radical initiated addition polymer prepared from a mixture of monomers comprising:
   (1) an epoxy monomer represented by the formula:

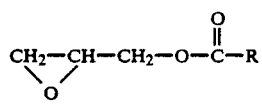

where R stands for a tertiary aliphatic hydrocarbon group having 4 to 26 carbon atoms, (2) a polymerizable alpha, beta-ethylenically unsaturated carboxylic acid, and
(3) optionally at least one other polymerizable alpha, beta-ethylenically unsaturated monomer;
(B) 10 to 50 percent by weight based on weight of resin solids of an acrylic copolymer different than (A) prepared from a mixture of monomers comprising:
(1) a monomer of the formula:

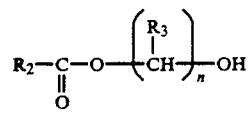

wherein $R_2$ is a polymerizable unsaturated hydrocarbon group, $R_3$ is hydrogen or $C_1$ to $C_4$ alkyl, $n=2$ to 4 and (2) at least one other unsaturated monomer copolymerizable therewith;
(C) 30 to 50 percent by weight based on weight of resin solids of a curing agent reactive with (A) and (B);

the percentages by weight being based on total weight of (A), (B) and (C).

2. The composition of claim 1 in which the monomers (A)(1) and (A)(2) are present in amounts of 80 to 100 percent by weight based on total weight of monomers which are used in preparing said addition polymer.

3. The composition of claim 1 in which R contains from 8 to 10 carbon atoms.

4. The composition of claim 1 in which the copolymerizable monomer (A)(3) is an alkyl ester of an alpha, beta-ethylenically unsaturated monocarboxylic acid containing from 1 to 12 carbon atoms in the alkyl group.

5. The composition of claim 4 in which the copolymerizable monomer (A)(3) is an ester of acrylic or methacrylic acid containing from 1 to 12 carbon atoms in the alkyl group.

6. The composition of claim 1 in which the monomer (B)(1) is present in amounts of 10 to 60 percent by weight based on total weight of monomers which are used in preparing said acrylic copolymer.

7. The composition of claim 1 in which the monomer (B)(1) is a hydroxyalkyl ester of acrylic or methacrylic acid having 2 to 4 carbon atoms in the alkyl group.

8. The composition of claim 1 in which the monomer (B)(2) is selected from the class consisting of alkyl esters of alpha, beta-ethylenically unsaturated monocarboxylic acids containing from 1 to 12 carbon atoms in the alkyl group, vinyl aromatic compounds including mixtures thereof.

9. The composition of claim 1 in which the curing agent (C) is an aminoplast resin.

10. The composition of claim 9 in which the aminoplast is a methylated melamine-formaldehyde condensate.

11. The composition of claim 1 which contains an acid phosphate curing catalyst which is present in amounts of 0.2 to 5 percent by weight based on weight of resin solids.

12. The composition of claim 11 in which the acid phosphate catalyst is phenyl acid phosphate.

* * * * *